Feb. 12, 1924.
J. W. HOSMER ET AL
DIRIGIBLE HEADLIGHT
Filed Dec. 9, 1922
1,483,807
2 Sheets-Sheet 1
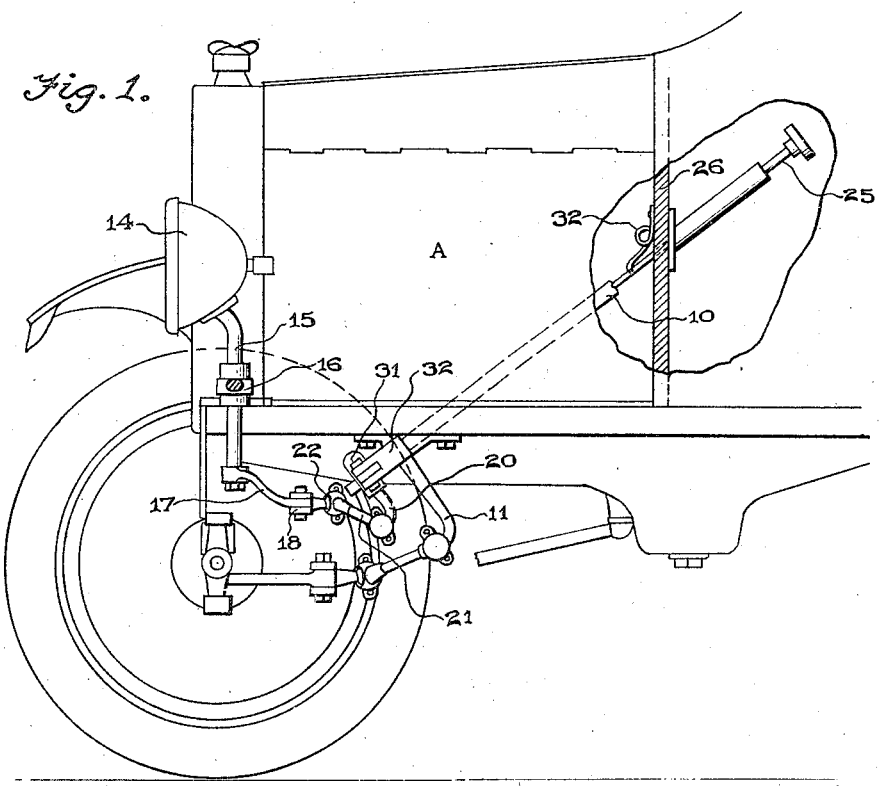
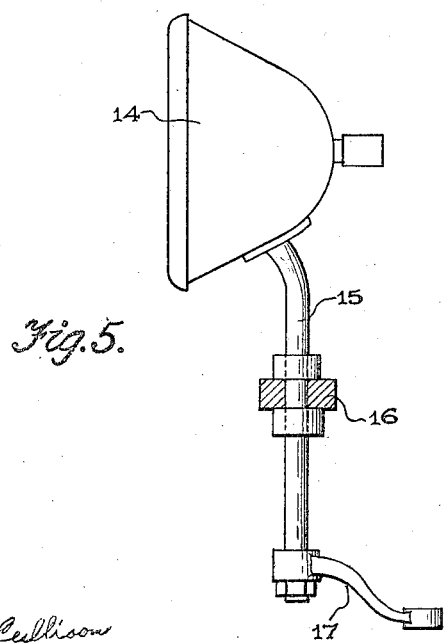
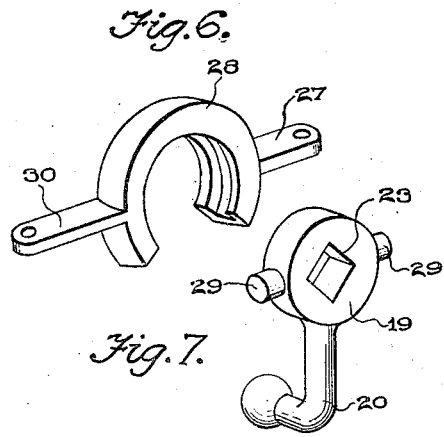
John W. Hosmer
Benjamin O. Guest, INVENTOR
BY Victor J. Evans
ATTORNEY Feb. 12, 1924. 1,483,807
J. W. HOSMER ET AL
DIRIGIBLE HEADLIGHT
Filed Dec. 9, 1922 2 Sheets-Sheet 2
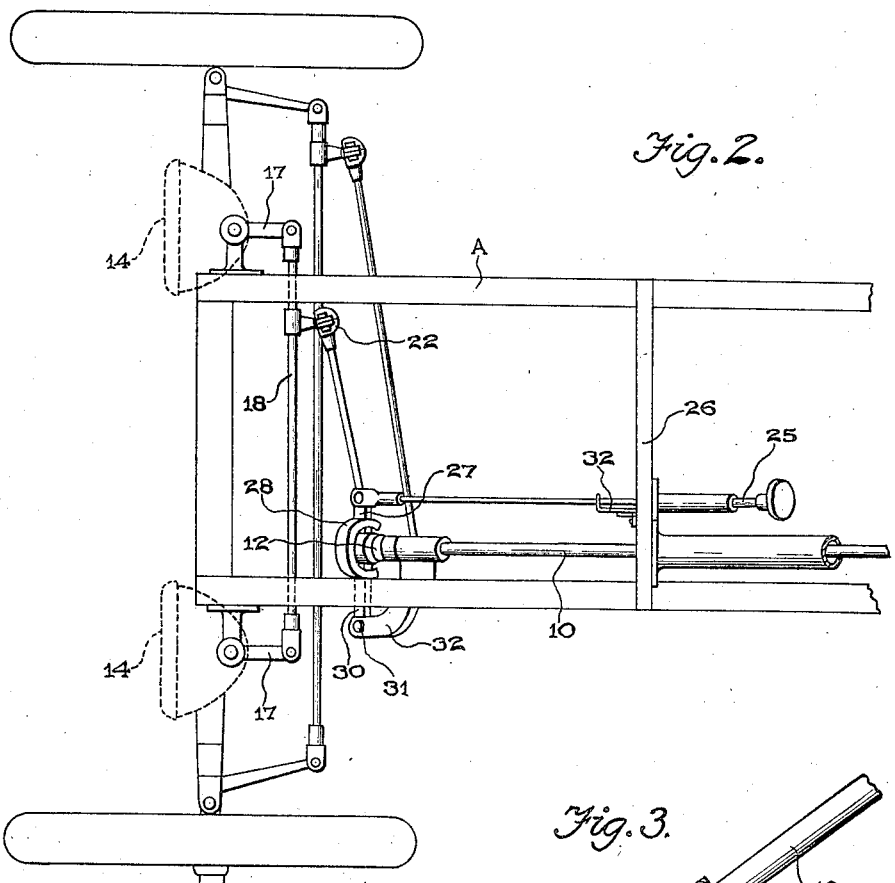
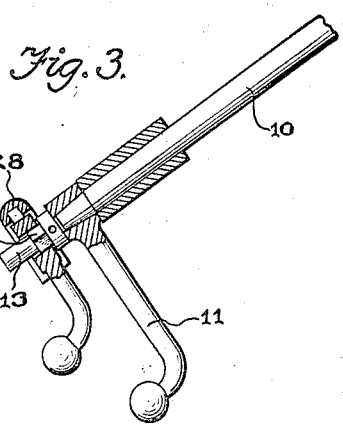
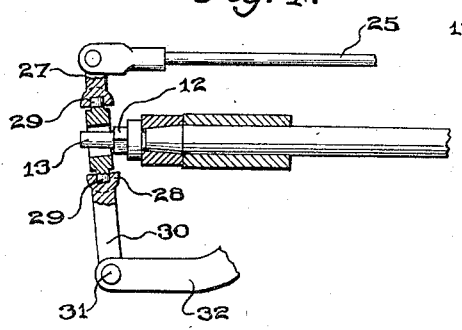
John W. Hosmer
Benjamin O. Guest INVENTOR Patented Feb. 12, 1924.

1,483,807

UNITED STATES PATENT OFFICE.

JOHN W. HOSMER AND BENJAMIN O. GUEST, OF CROSSVILLE, ALABAMA.

DIRIGIBLE HEADLIGHT.

Application filed December 9, 1922. Serial No. 605,925.

*To all whom it may concern:*

Be it known that we, JOHN W. HOSMER and BENJAMIN O. GUEST, citizens of the United States, residing at Crossville, in the county of Dekalb and State of Alabama, have invented new and useful Improvements in Dirigible Headlights, of which the following is a specification.

This invention relates to head lights or lamps for motor operated vehicles, and contemplates the provision of means whereby the lamps can be simultaneously turned in either direction incident to the steering of the vehicle, so as to maintain the light rays directly in advance of the course pursued by the vehicle, in addition to means for rendering the lamp turning means inactive so that the vehicle may be steered in the day time without imparting any movement to the lamps.

More specifically stated, the mechanism forming the subject matter of this invention embodies a clutch member which is slidably mounted on the lower end of the steering post for turning movement therewith when in one position thereon, and connected with the head lamps to turn the latter incident to the steering of the vehicle, a manually operable element being associated with the clutch member for shifting it to a position on the steering post to permit the latter to be actuated to steer the vehicle without imparting any movement to the lamps.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views and wherein:

Fig. 1 is a side elevation of the device attached to an automobile.

Fig. 2 is a plan view of the attached device.

Fig. 3 is a part sectional view of the connection of the operating arm to the steering post.

Fig. 4 is a part sectional view of the releasing device.

Fig. 5 shows the mounting of the lamp.

Figs. 6 and 7 show details of the connection shown in Figure 3.

Referring to the drawings in detail A indicates generally a fragmentary portion of a motor operated vehicle wherein the steering post is represented at 10 and supporting an arm 11 which forms part of the steering mechanism under the control of the steering post 10. Adjacent the lower extremity of the steering post, the latter is provided with a squared portion 12 and a tubular portion 13 for a purpose to be hereinafter set forth. The head lamps are indicated at 14, each including a post 15 mounted for rotation in a bearing 16. Projecting from the lower extremity of each post 15 is an arm 17, and these arms are connected by a transversely disposed rod 10, so that the lamps are actuated in unison for the purpose above specified.

In accordance with the present invention, we provide means for connecting the rod 18 with the steering post in a manner so that the rod may be actuated incident to the steering of the vehicle, and thus maintains the light rays directly in advance of the vehicle when turning curves or the like, or to permit the vehicle to be properly steered without disturbing the lamps. This means includes what we term a clutch element 19 which is slidable upon the steering post 10 and adapted to turn with the latter in one position thereon. Projecting from the clutch member 19 is an arm 20 which is pivotally associated with the adjacent end of a rod 21, the latter being connected in any suitable manner as at 22, with the rod 18. Consequently, when the clutch member 19 is rotated with the steering post 10 movement is imparted to the rod 18, and the head lamps turned in one or the other direction, thus of course depending upon the direction in which the vehicle is steered. The clutch member 19 is provided with a squared opening 23 to accommodate the squared portion 12 of the steering post for movement therewith, but when it is desired to maintain the head lamps stationary, such as for instance during the day time when their use is not necessary, the clutch member 19 is moved downwardly on the tubular portion 13 of the steering post. Obviously, in this position, the post 10 can be actuated without transmitting any movement whatever to the rod 18.

For the purpose of controlling the movements of the clutch member 19 we provide a manually operable rod 25 which is mounted to slide through an opening in the dash board 26 of the vehicle, and the lower end of this rod is pivotally connected with a lug 27 projecting from a guide 28 of the clutch member. This guide is semi-cylindrical in plan and of channeled formation in cross section, and receives the projections 29 carried by the clutch member 19. The clutch member obviously turns within this guide when it receives the squared portion 12 of the steering post. The guide is provided with an extension 30 which is pivoted as at 31 upon a bracket 32 secured to the underside of the frame of the vehicle. When it is desired to prevent the lamps from being turned incident to the steering of the vehicle, the manually operated rod above referred to is designed to be moved by the guide upon its pivot 31 and simultaneously shifting the clutch member 19 downwardly on to the tubular portion 13 of the post. These parts are returned to active position by simply elevating the operating rod. The rod is arranged in convenient reach of the operator of the vehicle, and it is held fixed in either of its positions by means of a spring 32.

While it is believed that from the foregoing description, the nature and advantages of the invention will be readily understood, we desire to have it known that we do not limit ourselves to what is herein shown and described and that such changes may be resorted to when desired as fall within the scope of what is claimed.

What we claim is:

The combination with the lamp posts of a motor operated vehicle, of means for simultaneously turning said posts incident to the steering of the vehicle, said means including a clutch member slidable on the steering post and movable therewith when in one position thereon, a channelled shaped member partly surrounding the steering post and constituting a guide from which the clutch member operates, means for pivotally supporting the guide, and means for shifting the guide longitudinally of the post, and positioning the clutch member to allow the vehicle to be steered without imparting movement to the lamps.

In testimony whereof we affix our signatures.

JOHN W. HOSMER.
BENJAMIN O. GUEST.